US011738954B2

(12) United States Patent
Kusunoki et al.

(10) Patent No.: US 11,738,954 B2
(45) Date of Patent: Aug. 29, 2023

(54) CONVEYANCE DEVICE

(71) Applicant: YAMAHA HATSUDOKI KABUSHIKI KAISHA, Iwata (JP)

(72) Inventors: Toshiyuki Kusunoki, Iwata (JP); Junichi Tsuyuki, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/782,486

(22) PCT Filed: Dec. 17, 2019

(86) PCT No.: PCT/JP2019/049309
§ 371 (c)(1),
(2) Date: Jun. 3, 2022

(87) PCT Pub. No.: WO2021/124429
PCT Pub. Date: Jun. 24, 2021

(65) Prior Publication Data
US 2023/0002169 A1    Jan. 5, 2023

(51) Int. Cl.
*B65G 43/08* (2006.01)
*B65G 54/02* (2006.01)

(52) U.S. Cl.
CPC ............. *B65G 43/08* (2013.01); *B65G 54/02* (2013.01)

(58) Field of Classification Search
USPC ...................................................... 198/805
See application file for complete search history.

(56) References Cited

U.S. PATENT DOCUMENTS

| | | | | |
|---|---|---|---|---|
| 5,497,038 A | * | 3/1996 | Sink | H02K 41/03 |
| | | | | 310/12.09 |
| 10,164,555 B1 | * | 12/2018 | Ozimek | H02M 7/5395 |
| 10,587,212 B1 | * | 3/2020 | Van Dorpe | H02K 11/30 |
| 2019/0160609 A1 | * | 5/2019 | Nakamura | B23P 19/04 |

FOREIGN PATENT DOCUMENTS

| | | | | |
|---|---|---|---|---|
| EP | 4108603 | * | 12/2022 | ............ B65G 54/02 |
| JP | H04-020477 A | | 1/1992 | |
| JP | 2008-310659 A | | 12/2008 | |
| JP | 5473591 B2 | | 4/2014 | |
| JP | 5681512 B2 | | 3/2015 | |
| JP | 2019-062614 A | | 4/2019 | |

(Continued)

OTHER PUBLICATIONS

An Office Action mailed by the Japanese Patent Office dated Jan. 10, 2023, which corresponds to Japanese Patent Application No. 2021-565189 and is related to U.S. Appl. No. 17/782,486.

(Continued)

*Primary Examiner* — James R Bidwell
(74) *Attorney, Agent, or Firm* — Studebaker & Brackett PC (57) ABSTRACT

A conveyance device includes a slider, and a conveyor including a linear motor and a plurality of guide rails over which the slider is transferable, and being configured to convey the slider. The conveyance device further includes a controller configured or programmed to acquire, based on a vibration in a connecting portion between the plurality of guide rails or driving electric power of the linear motor in the connecting portion between the plurality of guide rails, a transfer state of the slider between the guide rails.

12 Claims, 3 Drawing Sheets

(56) References Cited

FOREIGN PATENT DOCUMENTS

| | | |
|---|---|---|
| JP | 2019-155484 A | 9/2019 |
| JP | 6611991 B1 | 11/2019 |
| WO | 2021186040 * 9/2021 | ............ B65G 54/02 |

OTHER PUBLICATIONS

International Search Report issued in PCT/JP2019/049309; dated Feb. 10, 2020.
Written Opinion issued in PCT/JP2019/049309; dated Feb. 10, 2020.

* cited by examiner

CONVEYANCE DEVICE

CROSS-REFERENCE TO RELATED APPLICATION

This application is a National Stage of International Patent Application No. PCT/JP2019/049309, filed Dec. 17, 2019, the entire content of which is incorporated herein by reference.

BACKGROUND

Technical Field

The present disclosure relates to a conveyance device, and more particularly, it relates to a conveyance device including a conveyor that includes a plurality of guide rails over which a slider is transferable.

Background Art

Conventionally, a conveyance device including a conveyor that includes a plurality of guide rails over which a slider is transferable is known. Such a conveyance device is disclosed in Japanese Patent Laid-Open No. 2019-062614, for example.

Japanese Patent Laid-Open No. 2019-062614 discloses a conveyance device including a platform car (slider) and a conveyor that conveys the platform car. The conveyor includes a linear motor and a plurality of guide rails over which the platform car is transferable. In the conveyance device described in Japanese Patent Laid-Open No. 2019-062614, the position of the guide rail over which the platform car is transferred is corrected based on information on the positions of the guide rails such that a connecting position between the guide rails is accurately determined.

SUMMARY

However, in the conveyance device described in Japanese Patent Laid-Open No. 2019-062614, when the bimetallic effect with a platform on which the platform car is installed occurs due to a change in the installation environment temperature, or the shape of a connecting portion of the guide rails changes due to a change over time, for example, it becomes difficult to accurately align the connecting position of the plurality of guide rails. In this case, there is a high possibility that an impact occurs on the platform car at the connecting position of the plurality of guide rails, and the platform car and the guide rails are damaged.

Accordingly the present disclosure provides a conveyance device capable of significantly reducing or preventing damage to a plurality of guide rails and a slider due to an impact on the slider at a connecting position of the guide rails.

A conveyance device according to an aspect of the present disclosure includes a slider, and a conveyor including a linear motor and a plurality of guide rails over which the slider is transferable. The conveyor is configured to convey the slider. The conveyance device further includes a controller configured or programmed to acquire, based on a vibration in a connecting portion between the plurality of guide rails or driving electric power of the linear motor in the connecting portion between the plurality of guide rails, a transfer state of the slider between the guide rails.

As described above, the conveyance device according to this aspect of the present disclosure includes the controller configured or programmed to acquire, based on the vibration or the driving electric power of the linear motor in the connecting portion between the plurality of guide rails, the transfer state of the slider between the guide rails. Accordingly, when the slider passes through the connecting portion between the guide rails, the transfer state of the slider between the guide rails can be understood based on the vibration or the driving electric power, and thus it is possible to predict in advance that an impact will occur on the slider in the connecting portion between the guide rails. Thus, generation of the vibration can be effectively reflected in the preventive maintenance of the guide rails and the slider. Consequently, it is possible to significantly reduce or prevent damage to the guide rails and the slider due to the impact on the slider at a connecting position of the guide rails.

In the aforementioned conveyance device according to this aspect, the controller is preferably configured or programmed to perform a control to provide notification of the transfer state based on the transfer state of the slider between the guide rails. Accordingly, it is possible to provide notification before an abnormality occurs based on the transfer state of the slider between the guide rails, and thus before the guide rails and the slider are damaged, an operator can perform maintenance and inspection of the slider and the conveyor.

In the aforementioned conveyance device according to this aspect, the conveyor preferably includes fixed first and second conveyors, and a third conveyor including a movement mechanism configured to move the guide rails and the linear motor. The third conveyor is configured to convey the slider from the first conveyor to the second conveyor. The controller is preferably configured or programmed to acquire the transfer state of the slider between the guide rails based on the vibration or the driving electric power of the linear motor in at least one of a connecting portion between the guide rails from the first conveyor to the third conveyor or a connecting portion between the guide rails from the third conveyor to the second conveyor. Accordingly, in the connecting portion between the guide rails of the third conveyor that moves with respect to the fixed first and second conveyors and the first or second conveyor, a change in the transfer state due to a change in the alignment accuracy can be acquired. Thus, it is possible to significantly reduce or prevent damage to the guide rails and the slider in the connecting portion between the guide rails that move relative to each other.

The aforementioned conveyance device including the conveyor including the first conveyor, the second conveyor, and the third conveyor preferably further includes a vibration sensor provided in a vicinity of the connecting portion of the guide rails between the third conveyor and the first or second conveyor, and the controller is preferably configured or programmed to acquire the transfer state of the slider between the guide rails based on a vibration detection result of the vibration sensor. Accordingly, the vibration at the time of transfer of the slider between the guide rails can be easily acquired by the vibration sensor provided in the vicinity of the connecting portion of the guide rails between the third conveyor and the first or second conveyor.

In this case, the vibration sensor is preferably provided in the third conveyor. Accordingly, the vibration sensor is provided in the movable third conveyor such that it is possible to accurately detect the vibration of the third conveyor, which is more likely to vibrate than the fixed first or second conveyor.

In the aforementioned conveyance device including the conveyor including the first conveyor, the second conveyor, and the third conveyor, the first conveyor and the second conveyor each preferably include a plurality of conveyance modules including the guide rails and the linear motor. The plurality of conveyance modules are connected in series to each other. The controller is preferably configured or programmed to acquire the transfer state of the slider between the guide rails based on the vibration or the driving electric power of the linear motor in a connecting portion between the guide rails of the plurality of conveyance modules connected in series to each other. Accordingly, it is possible to acquire the transfer state of the slider in the connecting portion of the guide rails between the conveyance modules of the fixed first or second conveyor.

In the aforementioned conveyance device according to this aspect, the controller is preferably configured or programmed to provide notification of the transfer state of the slider between the guide rails when the vibration or the driving electric power of the linear motor in the connecting portion between the guide rails exceeds a predetermined threshold. Accordingly, when the vibration or the driving electric power of the linear motor increases beyond the predetermined threshold, the operator can be prompted to perform maintenance and inspection of the slider and the conveyor.

In the aforementioned conveyance device according to this aspect, the controller is preferably configured or programmed to provide notification of the transfer state of the slider between the guide rails when the vibration or the driving electric power of the linear motor in the connecting portion between the guide rails increases by a predetermined percentage from an initial state. Accordingly, when the vibration or the driving electric power of the linear motor increases by the predetermined percentage from the initial state, the operator can be prompted to perform maintenance and inspection of the slider and the conveyor.

In the aforementioned conveyance device according to this aspect, the slider preferably includes a plurality of sliders, and the controller is preferably configured or programmed to distinguish each of the plurality of sliders and acquire the transfer state of the slider between the guide rails. Accordingly, it is possible to easily determine whether an increase in the vibration or the driving electric power of the linear motor is caused by the individual sliders or the connecting portion between or the guide rails.

According to the present disclosure, as described above, it is possible to significantly reduce or prevent damage to the guide rails and the slider due to the impact on the slider at the connecting position of the guide rails.

DETAILED DESCRIPTION

An embodiment embodying the present disclosure is hereinafter described on the basis of the drawings.

The configuration of a conveyance device 100 according to the embodiment of the present disclosure is now described with reference to FIGS. 1 to 4

Configuration of Conveyance Device

The conveyance device 100 according to this embodiment conveys an object to be conveyed placed on a slider 30 along conveyors 1 and 2. Operations are performed on the object to be conveyed by the conveyance device 100 at a plurality of conveyance positions. A robot or an operator performs operations on the object to be conveyed.

Figure 1:
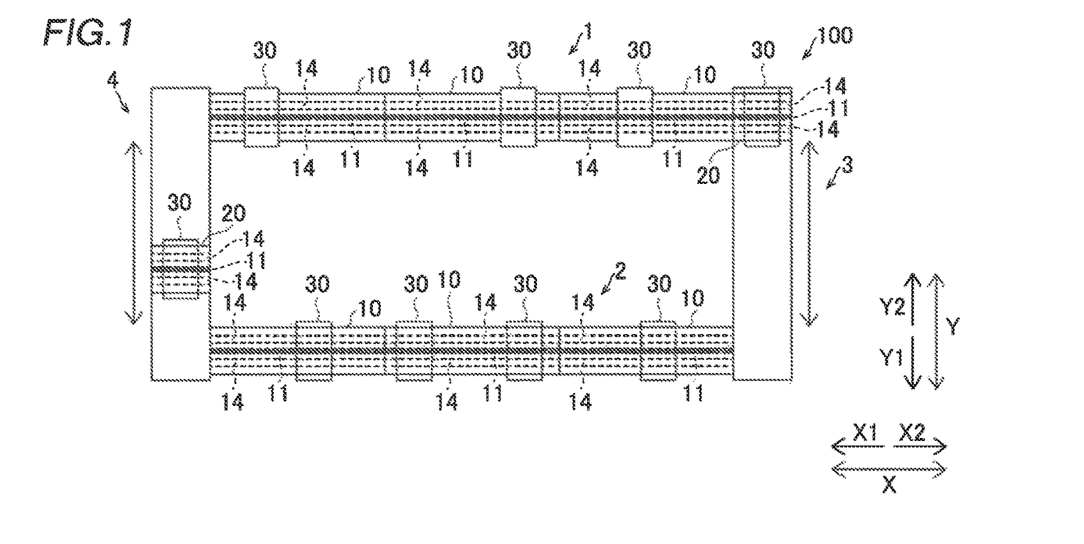
FIG. 1 is a plan view showing a conveyance device according to an embodiment of the present disclosure.
Figure 2:
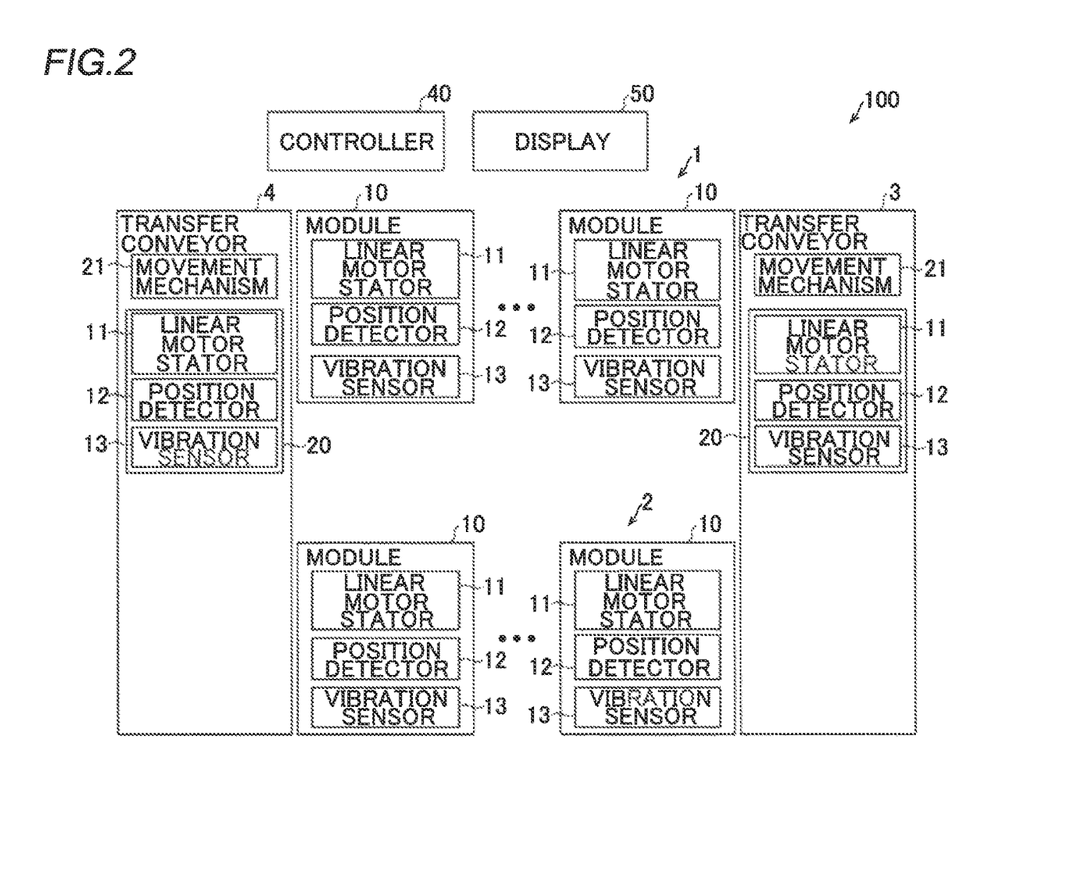
FIG. 2 is a block diagram showing the overall configuration of the conveyance device according to the embodiment of the present disclosure.

As shown in FIG. 1, the conveyance device 100 includes the conveyor 1, the conveyor 2, a transfer conveyor 3, a transfer conveyor 4, and the slider 30. Furthermore, as shown in FIG. 2, the conveyance device 100 includes a controller 40 and a display 50. The conveyor 1 is an example of a "first conveyor" or a "second conveyor" in the claims, and the conveyor 2 is an example of a "first conveyor" or a "second conveyor" in the claims. The transfer conveyor 3 is an example of a "conveyor" or a "third conveyor" in the claims, and the transfer conveyor 4 is an example of a "conveyor" or a "third conveyor" in the claims.

The conveyor 1 includes a plurality of (three) conveyance modules 10. The conveyor 2 includes a plurality of (three) conveyance modules 10. The plurality of conveyance modules 10 are connected in series to each other, and a conveyance path for the slider 30 is formed therein. The slider 30 is conveyed on the conveyors 1 and 2 in an X direction, and is conveyed from the conveyor 1 (2) to the conveyor 2 (1) in a Y direction by the transfer conveyors 3 and 4. That is, the slider 30 is conveyed and circulated in the order of the conveyor 1, the transfer conveyor 3, the conveyor 2, and the transfer conveyor 4.

Figure 3:
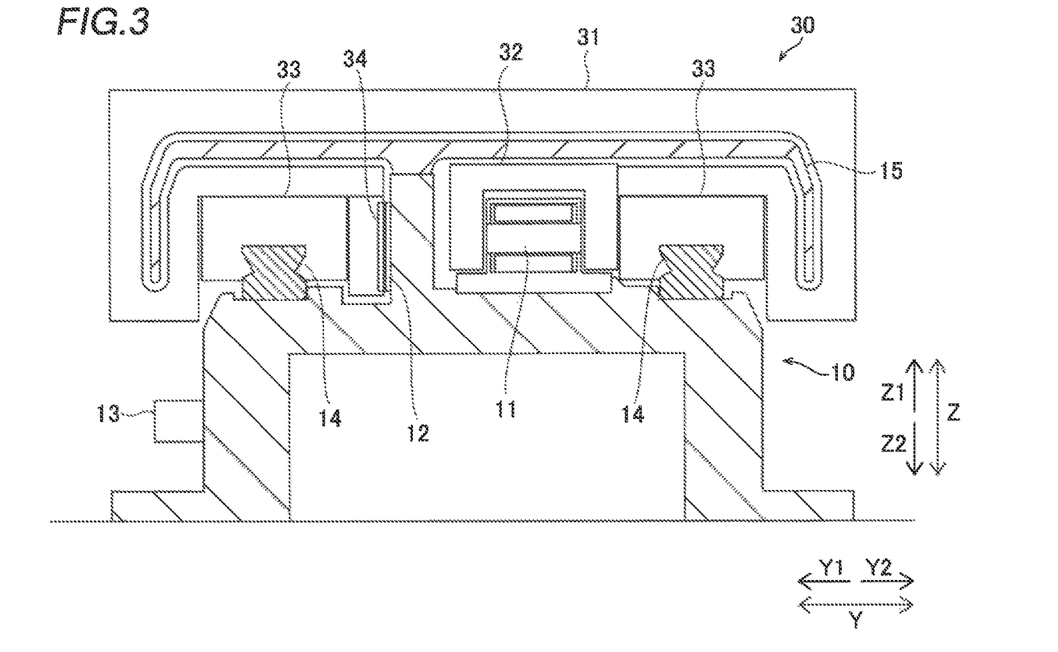
FIG. 3 is a sectional view showing a conveyor and a slider of the conveyance device according to the embodiment of the present disclosure.
Figure 4:
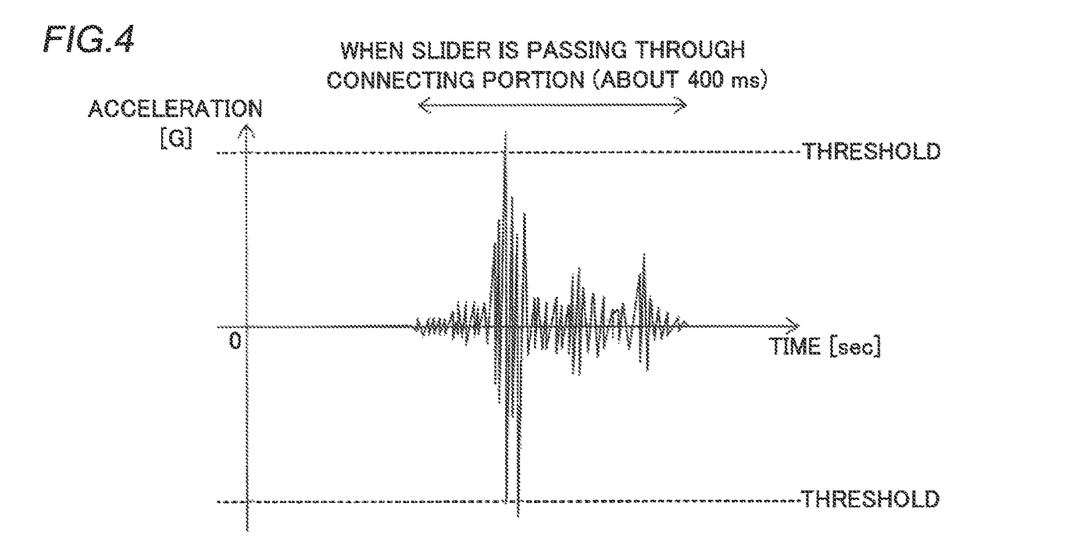
FIG. 4 is a diagram showing an example of vibration detection of the conveyance device according to the embodiment of the present disclosure.

As shown in FIG. 2, the conveyance modules 10 each include a linear motor stator 11, a position detector 12, and a vibration sensor 13. Furthermore, the conveyance modules 10 each include guide rails 14, as shown in FIGS. 1 and 3. Moreover, the conveyance modules 10 each include a cover 15. The linear motor stator 11 is an example of a "linear motor" in the claims.

As shown in FIG. 2, the transfer conveyors 3 and 4 each include a conveyance mechanism 20 that conveys the slider 30 in the X direction and a movement mechanism 21 that moves the conveyance mechanism 20 in the Y direction. The conveyance mechanism 20 includes a linear motor stator 11, a position detector 12, and a vibration sensor 13. The movement mechanism 21 includes guide rails and a ball screw mechanism.

As shown in FIG. 3, the slider 30 includes a slider main body 31, a linear motor mover 32, guide blocks 33, and a magnetic scale 34. A plurality of sliders 30 are provided. The plurality of sliders 30 move independently on the conveyors 1 and 2 and the transfer conveyors 3 and 4.

The conveyors 1 and 2 are provided substantially parallel to each other. The conveyor 1 conveys the slider 30 in an X2 direction, and the conveyor 2 conveys the slider 30 in an X1 direction. The conveyors 1 and 2 are fixed onto a platform. That is, the linear motor stators 11 and the guide rails 14 of the conveyors 1 and 2 are fixedly provided.

The transfer conveyor 3 is arranged adjacent on the X2 direction sides of the conveyors 1 and 2. The transfer conveyor 4 is arranged adjacent on the X1 direction sides of the conveyors 1 and 2. The transfer conveyors 3 and 4 move the guide rails 14 and the linear motor stators 11 in the Y direction with the movement mechanisms 21. The transfer conveyors 3 and 4 are provided to convey the slider 30 from the conveyor 1 (2) to the conveyor 2 (1).

The linear motor stators 11 each include an electromagnet, and driving electric power (current) is supplied to the electromagnet such that the slider 30 is moved. The linear motor stators 11 are arranged along a conveyance direction (X direction). As shown in FIG. 3, the cores of the electromagnets of the linear motor stators 11 extend along the Y direction.

The position detectors 12 face the magnetic scale 34 provided on the slider 30 in the Y direction. The position detectors 12 detect the magnetism of the magnetic scale 34 to detect the position of the slider 30. The position of the slider 30 detected by the position detectors 12 is used for feedback control of movement of the slider 30.

The vibration sensors 13 detect vibrations generated when the slider 30 moves. Specifically, the vibration sensors 13 detect vibrations generated when the slider 30 moves between the conveyance modules 10, vibrations generated when the slider 30 moves from the conveyance module 10 to the transfer conveyor 3, and vibrations generated when the slider 30 moves from the transfer conveyor 3 to the conveyance module 10. Furthermore, the vibration sensors 13 measure acceleration to detect vibrations. The vibration sensors 13 are provided in the vicinity of a connecting portion between the conveyance modules 10. Furthermore, the vibration sensors 13 are provided in the vicinity of connecting portions between the conveyance modules 10 and the transfer conveyors 3 and 4. The vibration sensor 13 is provided in the transfer conveyor 3 in the vicinity of connecting portions with the conveyance modules 10. The vibration sensor 13 is provided in the transfer conveyor 4 in the vicinity of connecting portions with the conveyance modules 10.

The guide rails 14 extend along the conveyance direction (X direction) of the slider 30. A pair of guide rails 14 are provided parallel to each other in the Y direction. The guide rails 14 are aligned such that the slider 30 is transferable between the conveyance modules 10 adjacent to each other in the X direction. The guide blocks 33 of the slider 30 engage with the guide rails 14 so as to be movable in the X direction.

The covers 15 are provided to cover upper portions of the linear motor stators 11, the position detectors 12, the vibration sensors 13, and the guide rails 14. That is, the covers 15 are provided such that the upper portions of the linear motor stators 11, the position detectors 12, the vibration sensors 13, and the guide rails 14 are not exposed even when the slider 30 is not provided.

The object to be conveyed is placed on the slider main body 31. Furthermore, the slider main body 31 is provided to surround the covers 15 of the conveyors 1 and 2 as viewed in the conveyance direction (X direction). The linear motor mover 32, the guide blocks 33, and the magnetic scale 34 are attached to the slider main body 31.

The linear motor mover 32 is provided to sandwich the linear motor stator 11 in the Y direction. The linear motor mover 32 includes a plurality of permanent magnets arranged along the conveyance direction (X direction).

The guide blocks 33 are provided so as to be movable along the guide rails 14. The guide blocks 33 each include a plurality of balls that move and circulate along the moving direction.

The magnetic scale 34 is magnetized in a predetermined pattern along the conveyance direction (X direction).

The controller 40 controls each portion of the conveyance device 100. The controller 40 controls electric power supplied to the linear motor stators 11 to control movement of the slider 30. Furthermore, the controller 40 controls driving of the movement mechanisms 21 of the transfer conveyors 3 and 4 to control movement of the conveyance mechanisms 20. The controller 40 includes a CPU (central processing unit), a memory, etc.

The controller 40 acquires the transfer state of the slider 30 between the guide rails 14 based on vibrations in a connecting portion between a plurality of guide rails 14 or the driving electric power of the linear motor stators 11 in the connecting portion between the plurality of guide rails 14. Furthermore, the controller 40 performs a control to provide notification of the transfer state based on the transfer state of the slider 30 between the guide rails 14.

Specifically, the controller 40 displays the transfer state of the slider 30 between the guide rails 14 on the display 50 to provide notification.

The controller 40 acquires the transfer state of the slider 30 between the guide rails 14 based on vibrations or the driving electric power of the linear motor stators 11 in at least one of a connecting portion between the guide rails 14 from the conveyor 1 (2) to the transfer conveyor 3 (4) or a connecting portion between the guide rails 14 from the transfer conveyor 3 (4) to the conveyor 2 (1).

The controller 40 acquires the transfer state of the slider 30 between the guide rails 14 based on vibrations or the driving electric power of the linear motor stators 11 in a connecting portion between the guide rails 14 of the plurality of conveyance modules 10 connected in series to each other.

The controller 40 distinguishes each of the plurality of sliders 30 and acquires the transfer states of the sliders 30 between the guide rails 14. That is, the controller 40 distinguishes each of the plurality of sliders 30 and controls movement of each slider 30 while understanding the position of each slider 30. The controller 40 also acquires the state of the slider 30 located in the connecting portion between the guide rails 14 to acquire the transfer state at that time.

The controller 40 acquires the transfer state of the slider 30 between the guide rails 14 based on the vibration detection results of the vibration sensors 13.

The controller 40 provides notification of the transfer state of the slider 30 between the guide rails 14 when the vibrations or the driving electric power of the linear motor stators 11 in the connecting portion between the guide rails 14 exceeds a predetermined threshold. For example, as in an example shown in FIG. 4, when the acceleration caused by the vibrations exceeds a threshold, the controller 40 provides notification of the transfer state of the slider 30 between the guide rails 14. The threshold is set to a value that does not damage the slider 30 and the guide rails 14. Furthermore, the controller 40 sets a predetermined period of time (400 milliseconds, for example) as a period of time during which the slider 30 passes through the connecting portion between the guide rails 14. Then, the controller 40 recognizes vibrations within the predetermined period of time as vibrations generated in the connecting portion.

The controller 40 provides notification of the transfer state of the slider 30 between the guide rails 14 when the vibrations or the driving electric power of the linear motor stators 11 in the connecting portion between the guide rails 14 increases by a predetermined percentage from the initial state. For example, the controller 40 provides notification of the transfer state when the maximum value of the vibrations in the connecting portion between the guide rails 14 increases by a predetermined percentage (20%, for example) from the initial state (at the time of installation). The controller 40 also provides notification of the transfer state when the maximum value of the driving electric power of the linear motor stators 11 in the connecting portion between the guide rails 14 increases by a predetermined percentage (20%, for example) from the initial state (at the time of installation).

For example, the controller 40 displays, on the display 50, a notification indicating that "at a location P1, vibrations are increasing from a date and time T1. Please check the positions of the guide rails in a connecting portion at the location P1". The controller 40 also displays, on the display 50, a notification indicating that "at a location P2, vibrations are increasing from a date and time T2 with respect to a slider D1. Please check the positions of the guide rails in a connecting portion at the location P2 and check the state of the slider D1". The controller 40 also displays, on the display 50, a notification indicating that "at a location P3, a current value at the time of transfer is increasing from a date and time T3. Please check the positions of the guide rails in a connecting portion at the location P3". The controller 40 also displays, on the display 50, a notification indicating that "at a location P4, a current value at the time of transfer is increasing from a date and time T4 with respect to a slider D2. Please check the positions of the guide rails in a connecting portion at the location P4 and check the state of the slider D2". The controller 40 also displays, on the display 50, a notification indicating that "at a location P5, vibrations and a current value at the time of transfer are increasing from a date and time T5. Please check the positions of the guide rails in a connecting portion at the location P5". The controller 40 also displays, on the display 50, a notification indicating that "at a location P6, vibrations and a current value at the time of transfer are increasing from a date and time T6 with respect to a slider D3. Please check the positions of the guide rails in a connecting portion at the location P6 and check the state of the slider D3".

The display 50 displays a screen for operating the conveyance device 100, information on the state of the conveyance device 100, information on an operation state, etc. The display 50 also displays the transfer state of the slider 30 between the guide rails 14. The display 50 is a thin display such as a liquid crystal display or an organic EL display. Furthermore, the display 50 includes a touch panel to receive operations.

Transfer State Notification Process

A transfer state notification process performed by the controller 40 of the conveyance device 100 is now described with reference to FIG. 5.

Figure 5:
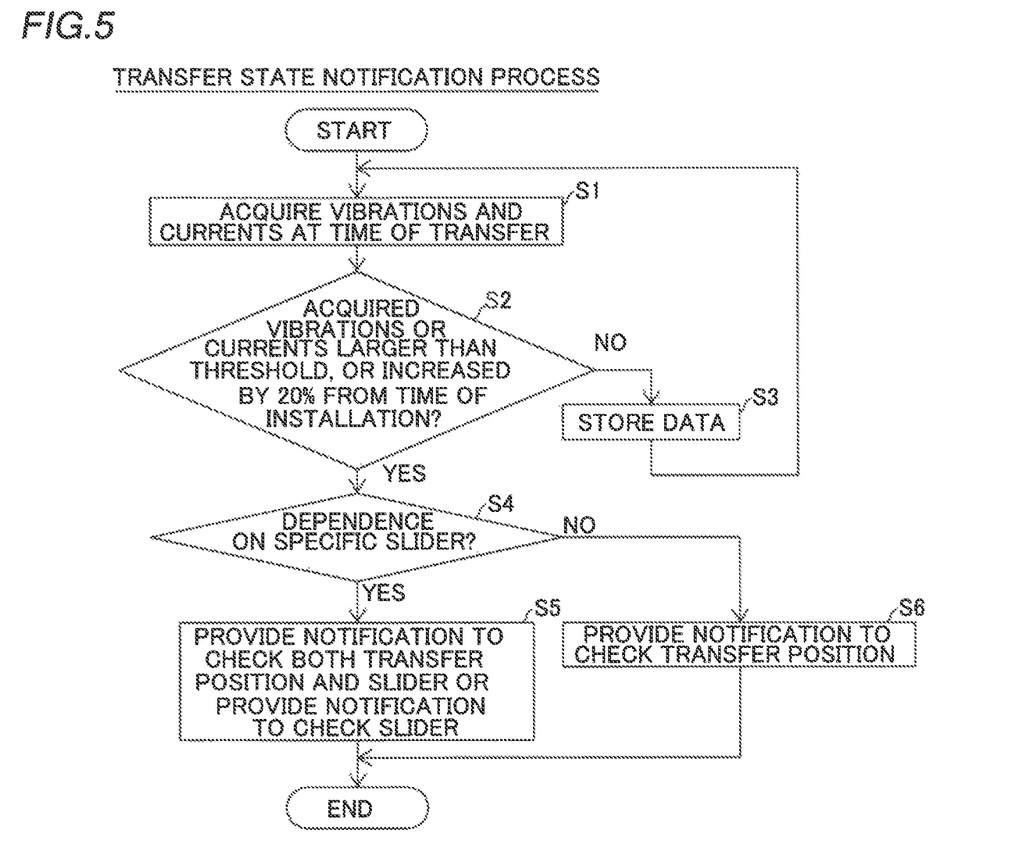
FIG. 5 is a flowchart illustrating a transfer state notification process performed by a controller of the conveyance device according to the embodiment of the present disclosure.

In step S1 of FIG. 5, the controller 40 acquires vibrations at the time of transfer of the slider 30 between the guide rails 14 and the driving currents of the linear motor stators 11 at the time of transfer of the slider 30 between the guide rails 14. In step S2, the controller 40 determines whether the acquired vibrations or driving currents are larger than the threshold, or whether the acquired vibrations or driving currents have increased by 20% or more from the time of installation. When the acquired vibrations or driving currents are larger than the threshold, or when the acquired vibrations or driving currents have increased by 20% or more from the time of installation, the process advances to step S4. When the acquired vibrations or driving currents are equal to or less than the threshold and the acquired vibrations or driving currents have not increased by 20% or more from the time of installation, the process advances to step S3.

In step S3, the controller 40 determines that there is no problem. In this case, notification of the transfer state of the slider 30 between the guide rails 14 is not provided. In addition, the acquired vibrations at the time of transfer of the slider 30 between the guide rails 14 and the acquired driving currents of the linear motor stators 11 at the time of transfer of the slider 30 between the guide rails 14 are stored. After that, the process returns to step S1.

In step S4, the controller 40 determines whether or not there is dependence on the specific slider 30. That is, the controller 40 determines whether or not vibrations are generated when the specific slider 30 passes through the connecting portion between the guide rails 14. When vibrations are generated in the connecting portion between the guide rails 14 with respect to a plurality of sliders 30, the controller 40 determines that there is no dependence on the specific slider 30. When there is dependence on the specific slider 30, the process advances to step S5, and when there is no dependence on the specific slider 30, the process advances to step S6.

In step S5, the controller 40 provides notification to check both the transfer position between the guide rails 14 and the specific slider 30. When only the specific slider 30 is involved in the vibrations, notification is provided to check the specific slider 30. After that, the transfer state notification process is terminated.

In step S6, the controller 40 provides notification to check the transfer position between the guide rails 14. After that, the transfer state notification process is terminated.

Advantageous Effects of this Embodiment

According to this embodiment, the following advantageous effects are achieved.

According to this embodiment, as described above, the conveyance device 100 includes the controller 40 configured or programmed to acquire the transfer state of the slider 30 between the guide rails 14 based on the vibrations in the connecting portion between the plurality of guide rails 14 or the driving electric power of the linear motors in the connecting portion between the plurality of guide rails 14. Accordingly, when the slider 30 passes through the connecting portion between the guide rails 14, the transfer state of the slider 30 between the guide rails 14 can be understood based on the vibrations or the driving electric power, and thus it is possible to predict in advance that an impact will occur on the slider 30 in the connecting portion between the guide rails 14. Thus, generation of the vibrations can be effectively reflected in the preventive maintenance of the guide rails 14 and the slider 30. Consequently, it is possible to significantly reduce or prevent damage to the guide rails 14 and the slider 30 due to the impact on the slider 30 at a connecting position of the guide rails 14.

According to this embodiment, as described above, the controller 40 is configured or programmed to perform a control to provide notification of the transfer state based on the transfer state of the slider 30 between the guide rails 14. Accordingly, it is possible to provide notification before an abnormality occurs based on the transfer state of the slider 30 between the guide rails 14, and thus before the guide rails 14 and the slider 30 are damaged, the operator can perform maintenance and inspection of the slider 30, the conveyors 1 and 2, and the transfer conveyors 3 and 4.

According to this embodiment, as described above, the controller 40 is configured or programmed to acquire the transfer state of the slider 30 between the guide rails 14 based on the vibrations or the driving electric power of the linear motors in at least one of the connecting portion between the guide rails 14 from the conveyor 1 (2) to the transfer conveyor 3 (4) or the connecting portion between the guide rails 14 from the transfer conveyor 3 (4) to the conveyor 2 (1). Accordingly, in the connecting portion between the guide rails 14 of the transfer conveyor 3 (4) that moves with respect to the fixed conveyors 1 and 2 and the conveyor 1 or 2, a change in the transfer state due to a change in the alignment accuracy can be acquired. Thus, it is possible to significantly reduce or prevent damage to the guide rails 14 and the slider 30 in the connecting portion between the guide rails 14 that move relative to each other.

According to this embodiment, as described above, the vibration sensor 13 is provided in the vicinity of the connecting portion of the guide rails 14 between the transfer conveyor 3 (4) and the conveyor 1 or 2, and the controller 40 is configured or programmed to acquire the transfer state of the slider 30 between the guide rails 14 based on the vibration detection result of the vibration sensor 13. Accordingly, the vibrations at the time of transfer of the slider 30 between the guide rails 14 can be easily acquired by the vibration sensor 13 provided in the vicinity of the connecting portion of the guide rails 14 between the transfer conveyor 3 (4) and the conveyor 1 or 2.

According to this embodiment, as described above, the vibration sensor 13 is provided in the transfer conveyors 3 and 4. Accordingly, the vibration sensor 13 is provided in the movable transfer conveyors 3 and 4 such that it is possible to accurately detect the vibrations of the transfer conveyor, which is more likely to vibrate than the fixed conveyor 1 or 2.

According to this embodiment, as described above, the controller 40 is configured or programmed to acquire the transfer state of the slider 30 between the guide rails 14 based on the vibrations or the driving electric power of the linear motors in the connecting portion between the guide rails 14 of the plurality of conveyance modules 10 connected in series to each other. Accordingly, it is possible to acquire the transfer state of the slider 30 in the connecting portion of the guide rails 14 between the conveyance modules 10 of the fixed conveyor 1 or 2.

According to this embodiment, as described above, the controller 40 is configured or programmed to provide notification of the transfer state of the slider 30 between the guide rails 14 when the vibrations or the driving electric power of the linear motors in the connecting portion between the guide rails 14 exceeds the predetermined threshold. Accordingly, when the vibrations or the driving electric power of the linear motors increases beyond the predetermined threshold, the operator can be prompted to perform maintenance and inspection of the slider 30, the conveyors 1 and 2, and the transfer conveyors 3 and 4.

According to this embodiment, as described above, the controller 40 is configured or programmed to provide notification of the transfer state of the slider 30 between the guide rails 14 when the vibrations or the driving electric power of the linear motors in the connecting portion between the guide rails 14 increases by the predetermined percentage from the initial state. Accordingly, when the vibrations or the driving electric power of the linear motors increases by the predetermined percentage from the initial state, the operator can be prompted to perform maintenance and inspection of the slider 30, the conveyors 1 and 2, and the transfer conveyors 3 and 4.

According to this embodiment, as described above, the controller 40 is configured or programmed to distinguish each of the plurality of sliders 30 and acquire the transfer state of the slider 30 between the guide rails 14. Accordingly, it is possible to easily determine whether an increase in the vibrations or the driving electric power of the linear motors is caused by the individual sliders 30 or the connecting portion between or the guide rails 14.

MODIFIED EXAMPLES

The embodiment disclosed this time must be considered as illustrative in all points and not restrictive. The scope of the present disclosure is not shown by the above description of the embodiment but by the scope of claims for patent, and all modifications (modified examples) within the meaning and scope equivalent to the scope of claims for patent are further included.

For example, while the example in which both the vibrations and the driving electric power of the linear motors in the connecting portion between the guide rails are detected to acquire the transfer state between the guide rails has been shown in the aforementioned embodiment, the present disclosure is not restricted to this. In the present disclosure, at least one of the vibrations or the driving electric power of the linear motors in the connecting portion between the guide rails may be detected to acquire the transfer state between the guide rails. When the vibrations in the connecting portion between the guide rails are not detected, the vibration sensor may not be provided.

While the example in which the vibration sensor is provided in each of the plurality of conveyance modules and the transfer conveyors (third conveyor) has been shown in the aforementioned embodiment, the present disclosure is not restricted to this. In the present disclosure, the vibration sensor may be provided in only one of the conveyance modules in the connecting portion between the guide rails or in only one of the conveyance module and the third conveyor in the connecting portion between the guide rails.

While the example in which the movement mechanism of each of the transfer conveyors (third conveyor) moves the linear motor and the guide rails horizontally has been shown in the aforementioned embodiment, the present disclosure is not restricted to this. In the present disclosure, the movement mechanism of the third conveyor may move the linear motor and the guide rails vertically. In this case, the first conveyor and the second conveyor may be arranged vertically.

While the example in which the movement mechanism of each of the transfer conveyors (third conveyor) translates the linear motor and the guide rails has been shown in the aforementioned embodiment, the present disclosure is not restricted to this. In the present disclosure, the movement mechanism of the third conveyor may rotate and move the linear motor and the guide rails.

While the example in which notification of the transfer state between the guide rails is provided by displaying the transfer state between the guide rails on the display has been shown in the aforementioned embodiment, the present disclosure is not restricted to this. In the present disclosure, notification of the transfer state between the guide rails may be provided by sound. Alternatively, information may be transmitted to an external terminal to provide notification.

While the example in which the conveyors (first conveyor and second conveyor) each include three conveyance modules has been shown in the aforementioned embodiment, the present disclosure is not restricted to this. In the present disclosure, the conveyors may include one, two or four or more conveyance modules.

While the control process operations performed by the controller are described, using the flow described in a manner driven by a flow in which processes are performed in order along a process flow for the convenience of illustration in the aforementioned embodiment, the present disclosure is not restricted to this. In the present disclosure, the control process operations performed by the controller may be performed in an event-driven manner in which processes are performed on an event basis. In this case, the control process operations may be performed in a complete event-driven manner or in a combination of an event-driven manner and a manner driven by a flow.

What is claimed is:

1. A conveyance device comprising:
   a slider;
   a conveyor including a linear motor and a plurality of guide rails over which the slider is transferable, the conveyor being configured to convey the slider; and
   a controller configured or programmed to acquire, based on a vibration in a connecting portion between the plurality of guide rails or driving electric power of the linear motor in the connecting portion between the plurality of guide rails, a transfer state of the slider between the guide rails, wherein
   the controller is configured or programmed to perform a control to provide notification of the transfer state based on the transfer state of the slider between the guide rails;
   the conveyor includes fixed first and second conveyors, and a third conveyor including a movement mechanism configured to move the guide rails and the linear motor, the third conveyor being configured to convey the slider from the first conveyor to the second conveyor; and
   the controller is configured or programmed to acquire the transfer state of the slider between the guide rails based on the vibration or the driving electric power of the linear motor in at least one of a connecting portion between the guide rails from the first conveyor to the third conveyor or a connecting portion between the guide rails from the third conveyor to the second conveyor.

2. A conveyance device comprising:
   a slider;
   a conveyor including a linear motor and a plurality of guide rails over which the slider is transferable, the conveyor being configured to convey the slider; and
   a controller configured or programmed to acquire, based on a vibration in a connecting portion between the plurality of guide rails or driving electric power of the linear motor in the connecting portion between the plurality of guide rails, a transfer state of the slider between the guide rails, wherein
   the conveyor includes fixed first and second conveyors, and a third conveyor including a movement mechanism configured to move the guide rails and the linear motor, the third conveyor being configured to convey the slider from the first conveyor to the second conveyor; and
   the controller is configured or programmed to acquire the transfer state of the slider between the guide rails based on the vibration or the driving electric power of the linear motor in at least one of a connecting portion between the guide rails from the first conveyor to the third conveyor or a connecting portion between the guide rails from the third conveyor to the second conveyor.

3. The conveyance device according to claim 2, wherein the slider includes a plurality of sliders; and
   the controller is configured or programmed to distinguish each of the plurality of sliders and acquire the transfer state of the slider between the guide rails.

4. The conveyance device according to claim 2, further comprising:
   a vibration sensor provided in a vicinity of the connecting portion of the guide rails between the third conveyor and the first or second conveyor; wherein
   the controller is configured or programmed to acquire the transfer state of the slider between the guide rails based on a vibration detection result of the vibration sensor.

5. The conveyance device according to claim 4, wherein the vibration sensor is provided in the third conveyor.

6. The conveyance device according to claim 2, wherein the first conveyor and the second conveyor each include a plurality of conveyance modules including the guide rails and the linear motor, the plurality of conveyance modules being connected in series to each other; and
   the controller is configured or programmed to acquire the transfer state of the slider between the guide rails based on the vibration or the driving electric power of the linear motor in a connecting portion between the guide rails of the plurality of conveyance modules connected in series to each other.

7. The conveyance device according to claim 4, wherein the first conveyor and the second conveyor each include a plurality of conveyance modules including the guide rails and the linear motor, the plurality of conveyance modules being connected in series to each other; and
   the controller is configured or programmed to acquire the transfer state of the slider between the guide rails based on the vibration or the driving electric power of the linear motor in a connecting portion between the guide rails of the plurality of conveyance modules connected in series to each other.

8. The conveyance device according to claim 5, wherein the first conveyor and the second conveyor each include a plurality of conveyance modules including the guide rails and the linear motor, the plurality of conveyance modules being connected in series to each other; and
   the controller is configured or programmed to acquire the transfer state of the slider between the guide rails based on the vibration or the driving electric power of the linear motor in a connecting portion between the guide rails of the plurality of conveyance modules connected in series to each other.

9. The conveyance device according to claim 4, wherein the controller is configured or programmed to provide notification of the transfer state of the slider between the guide rails when the vibration or the driving electric power of the linear motor in the connecting portion between the guide rails exceeds a predetermined threshold.

10. The conveyance device according to claim 4, wherein the controller is configured or programmed to provide notification of the transfer state of the slider between the guide rails when the vibration or the driving electric power of the linear motor in the connecting portion between the guide rails increases by a predetermined percentage from an initial state.

11. The conveyance device according to claim 2, wherein the controller is configured or programmed to provide notification of the transfer state of the slider between the guide rails when the vibration or the driving electric power of the linear motor in the connecting portion between the guide rails exceeds a predetermined threshold.

12. The conveyance device according to claim 2, wherein the controller is configured or programmed to provide notification of the transfer state of the slider between the guide rails when the vibration or the driving electric power of the linear motor in the connecting portion between the guide rails increases by a predetermined percentage from an initial state.

\* \* \* \* \*